(12) United States Patent
Joshi et al.

(10) Patent No.: US 9,082,085 B2
(45) Date of Patent: Jul. 14, 2015

(54) COMPUTING ENVIRONMENT CLIMATE DEPENDENT POLICY MANAGEMENT

(75) Inventors: Neeraj Joshi, Morrisville, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1893 days.

(21) Appl. No.: 12/208,973

(22) Filed: Sep. 11, 2008

(65) Prior Publication Data

US 2010/0063950 A1 Mar. 11, 2010

(51) Int. Cl.
*G06Q 10/00* (2012.01)
*G06F 9/54* (2006.01)

(52) U.S. Cl.
CPC ............... *G06Q 10/00* (2013.01); *G06F 9/542* (2013.01)

(58) Field of Classification Search
CPC ........................................................ G06F 9/542
USPC ......................................... 707/694; 715/735
See application file for complete search history.

(56) References Cited

U.S. PATENT DOCUMENTS

| 7,213,068 | B1 | 5/2007 | Kohli et al. |
|---|---|---|---|
| 2004/0039942 | A1 | 2/2004 | Cooper et al. |
| 2006/0242684 | A1 | 10/2006 | Russell et al. |
| 2007/0143827 | A1 | 6/2007 | Nicodemus et al. |
| 2007/0143851 | A1 | 6/2007 | Nicodemus et al. |
| 2007/0268516 | A1* | 11/2007 | Bugwadia et al. ............ 358/1.15 |
| 2008/0256593 | A1* | 10/2008 | Vinberg et al. .................... 726/1 |

OTHER PUBLICATIONS

Gilat, "Autonomic Computing Building Self-Managing Computing System", 2005.*
Dudley et al., "Autonomic Self-Healing Systems in a Cross-Product IT Environment", 2004, IEEE.*
Agrawal et al., "Policy-Based Management of Networked Computing Systems", 2005, IEEE.*

* cited by examiner

*Primary Examiner* — Mariela Reyes
*Assistant Examiner* — Dawaune Conyers
(74) *Attorney, Agent, or Firm* — Stevens & Showalter, LLP (57) ABSTRACT

A computing environment climate-aware policy management system provides decision support by receiving a request to perform an action, where the request is communicated from or on behalf of a computing resource. Upon receiving the request, an indication of a computing environment climate is obtained, which may include for example, information related to the workflow associated with the requested action, information external to the workflow or other information that contextualizes the computing environment of components thereof. At least one policy is obtained that is associated with at least one of the action associated with the request, the resource associated with the request to perform the action received by the policy system manager, and the indicated climate. Each obtained policy is evaluated and a response to the request to perform the action is provided based upon the results of the policy evaluation.

21 Claims, 6 Drawing Sheets

COMPUTING ENVIRONMENT CLIMATE DEPENDENT POLICY MANAGEMENT

BACKGROUND OF THE INVENTION

The present invention relates to systems, computer-implemented methods and computer program products for providing action management in a computing environment.

Increasingly, customers of information technology (IT) products are relying on structured processes such as those defined in the information technology information library (ITIL) to provide concepts and techniques for managing their associated computing environments. 'ITIL' is a registered trademark granted to The Lords Commissioners of Her Majesty's Treasury Acting through the Office of Government Commerce and Central Computer and Telecommunications Agency, United Kingdom. In this regard, structured processes such as those defined in ITIL provide detailed descriptions, checklists, tasks and procedures related to a number of important IT practices that can be utilized in the management of computing environments, including the enterprise infrastructure, development, and operations.

BRIEF SUMMARY OF THE INVENTION

According to various aspects of the present invention, systems, computer-implemented methods and computer program products provide action management in a computing environment. Action management is provided by receiving an electronically communicated request to perform an action within a computing environment, where the request is received by a policy management system executing on a computer processing device and the request is communicated from or on behalf of a resource within the computing environment. To provide an action management decision in response to the received request, an indication of a computing environment climate is obtained. The obtained computing environment climate information comprises information that is of interest in evaluating the requested action, and may include, for example, information related to a workflow associated with the requested action, information external to the workflow or other information as described more fully herein.

At least one policy is also obtained from a storage device, where each obtained policy is associated with at least one of the action associated with the request, the resource associated with the request to perform the action received by the policy system manager, and the indicated climate. Moreover, each obtained policy is tagged with information that defines climate conditions that govern the applicability of the corresponding policy. Each obtained policy is evaluated in view of the obtained indication of computing environment climate and a response to the request to perform the action is provided based upon the results of the policy evaluation.

DETAILED DESCRIPTION OF THE INVENTION

According to various aspects of the present invention, systems, computer program products and methods provide action management by utilizing computing environment climate awareness to implement policy-based decision support. For example, a climate aware policy management system according to aspects of the present invention may be linked into an operational environment, e.g., to address unplanned outages or otherwise account for sources of failure in implemented operational procedures. In this regard, the policy management system may evaluate policies that have been tagged, e.g., augmented with computing environment climate dependencies that govern the applicability and/or evaluation of the policy in determining whether to approve or deny a request to perform an action.

Thus, for example, upon receiving a request to reboot a system server, the policy management system inspects the requested action and one or more policies. One of the inspected policies according to aspects of the present invention might state "do not reboot the system except when handling a critical incident." The policy management system thus becomes aware of relevant computing environment climate conditions to determine if a critical incident has occurred before determining whether to approve or deny the requested action.

Figure 1:
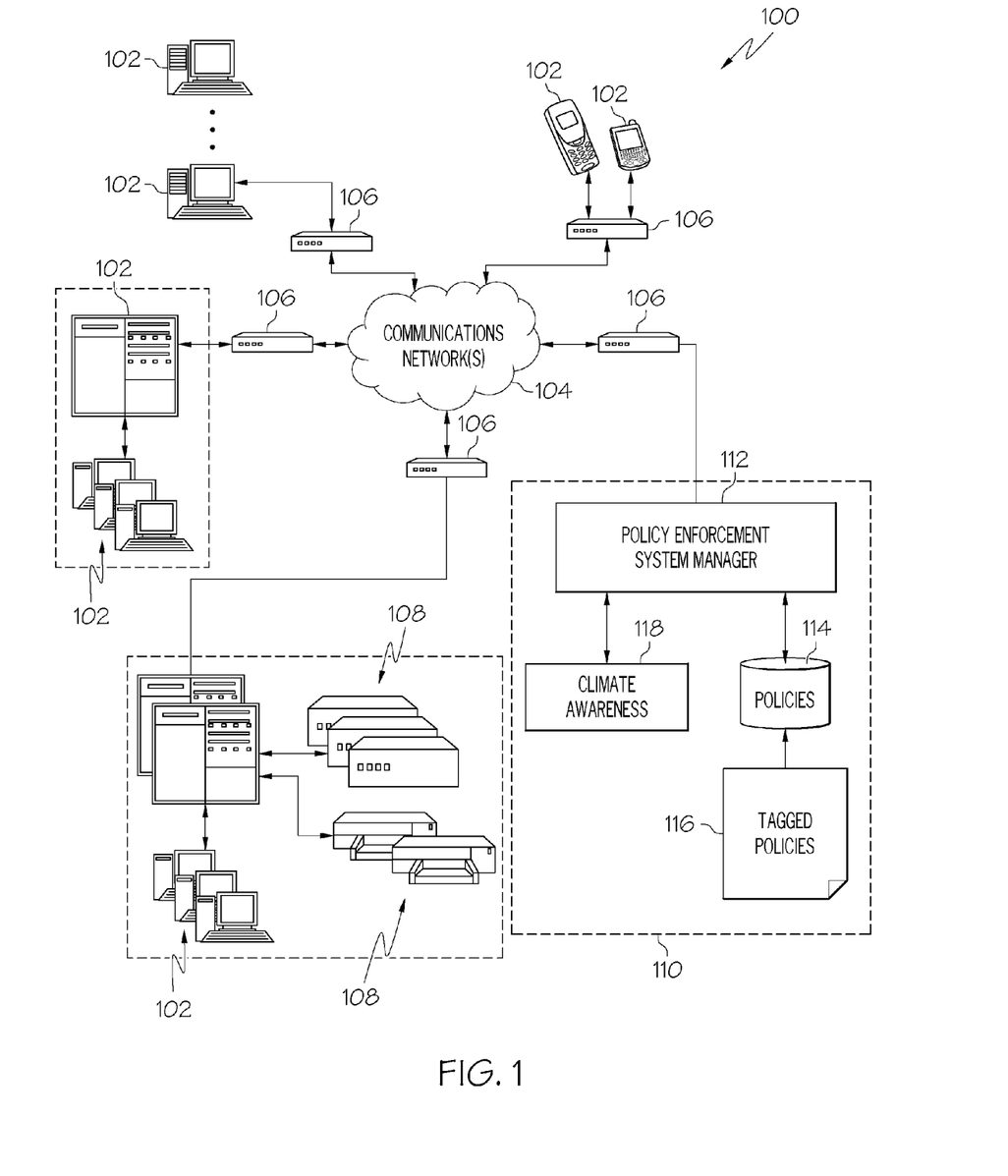
FIG. 1 is a schematic illustration of an exemplary computing system that supports climate dependent policy management according to various aspects of the present invention.

Referring now to the drawings and particularly to FIG. 1, a general diagram of a computing environment 100 is illustrated, which may implement climate aware policy management according to various aspects of the present invention. The computing environment 100 comprises a plurality of hardware and/or software processing devices, designated generally by the reference 102 that are linked together by a network 104. Typical processing devices 102 may include servers, personal computers, notebook computers, transactional systems, purpose-driven appliances, pervasive computing devices such as a personal data assistant (PDA), palm computers, cellular access processing devices, special purpose computing devices and/or other devices capable of communicating over the network 104. The processing devices 102 may also comprise software, including applications and servers that process information stored in various databases, spreadsheets, structured documents, unstructured documents and/or other files containing information.

The network 104 provides communications links between the various processing devices 102, and may be supported by networking components 106 that interconnect the processing devices 102, including for example, routers, hubs, firewalls, network interfaces, wired or wireless communications links and corresponding interconnections. Moreover, the network 104 may comprise connections using one or more intranets, extranets, local area networks (LAN), wide area networks (WAN), wireless networks (WIFI), the Internet, including the world wide web, and/or other arrangements for enabling communication between the processing devices 102, in either real time or otherwise, e.g., via time shifting, batch processing, etc. The computing environment 100 may also support optional network capable devices 108, such as printers, scanners, teleconferencing components, dedicated appliances, network attached storage (NAS) devices and other components that facilitate the tasks and capabilities supported by the computing environment 100.

The illustrative computing system 100 also includes a policy enforcement system 110, which is illustrated as having a policy enforcement system manager 112 and one or more policy databases 114 that support policies 116 as will be described in greater detail herein. In practice, the policy enforcement system 110 may be implemented on a single processing device 102 or the policy enforcement system 110, including its various components may be distributed across one or more processing devices 102.

For purposes of discussion herein, a "computing environment" comprises any environment in which information is electronically processed and/or exchanged. For example, the computing environment 100 is illustrated as a distributed computing system having a plurality of processing devices 102, 106, 108 coupled together by one or more networks 104. However, a computing environment as used herein is not limited to distributed systems. Rather, a computing environment may also comprise a single processing device, such as a server computer. As such, the network 104 is shown by way of illustration, and not by way of limitation, as a component within a computing environment in which various aspects of the present invention may be practiced.

In operation, various resources across the computing environment 100 may from time to time, issues requests to the policy enforcement system 110. Each issued request typically seeks permission to perform one or more tasks contemplated by the resource that issued the associated request. In this regard, a resource may comprise any physical or virtual component within the computing environment 100. As a few illustrative examples, each processing device 102 may itself be a resource. Moreover, within a given processing device 102, various internal components may define resources, including for example, virtual system resources such as files, network connections and memory areas, etc. The policy enforcement system manager 112 evaluates the requests in view of the policies 116 stored in the policy database(s) 114. Moreover, the policy enforcement system manager 112 responds to the requests with management decisions.

Computing environments are prone to errors in spite of potentially extensive operational procedures that may be initiated to prevent and/or respond to incidents. However, according to various aspects of the present invention, climate-dependent policy-based operation enforcement may be utilized by the policy enforcement system 110 to respond to incidents or other operational actions and/or to proactively take actions directed towards preventing such incidents that are adverse to the operation of processes within the computing environment. In this regard, the policy enforcement system 110 may utilize computing environment climate awareness 118 to influence policy based evaluations, as will be described in greater detail herein.

For example, climate-dependent policies may be utilized by the policy enforcement system 110 to electronically encode a computing environment operations manual, e.g., an ITIL implementation within a computing enterprise, in such a way that structured process decision support is climate dependent. As such, the policy enforcement system 110 according to various aspects of the present invention may overcome execution barriers in a manner that is context aware.

Climate dependent policies assist the policy enforcement system manager 112 in determining whether a denial or approval of the requested action should be issued. In this regard, policies utilized by the policy enforcement system 110 are tagged, e.g., augmented, modified, created with or otherwise include computing environment climate information that may affect the assessment of otherwise static rules, dynamic rules or complex rules. For example, a static rule that states "do not reboot the system" may be modified with climate information so as to realize a policy that specifies "do not reboot the system except when handling a critical incident". Thus, in this illustrative example, an exception is defined based upon a determination of a climate indicative of a critical incident workflow.

Climate information may also modify otherwise dynamic rules, i.e., rules that include variables. For example, dynamic rules may condition actions upon time, load or any other parameter that can vary, and which can be ascertained, e.g., by polling, querying, pushing or otherwise obtaining the necessary information. For example, a dynamic rule that states "do not reboot the system unless the time is after business hours" may be modified with climate information so as to realize a policy that specifies "do not reboot the system unless the reboot occurs after business hours and does not coincide with the execution of scheduled management reports, except when handling a critical incident.".

Thus, in this illustrative example, the original rule is augmented such that approval of the action (reboot) is now predicated upon a climate condition (does not coincide with the execution of scheduled management reports) that is external to the workflow associated with the reboot action. Moreover, the original rule is augmented such that approval of the action (reboot) is now predicated upon a climate condition indicative of a critical incident workflow. In this regard, the policy enforcement system 110 may recognize the workflow associated with the requested action itself. If the request to reboot is issued as part of a detected critical incident workflow, then the exception may be satisfied. In another exemplary arrangement, a determined workflow associated with a critical incident need not be directly associated with the requested action to reboot.

Thus, the climate conditions of interest may relate to the workflow associated with the corresponding requested action, the climate conditions of interest may relate to a workflow that is not associated with the requested action, or the climate conditions may take into account multiple workflows, each of which may or may not be associated with the requested action.

Climate information may further modify complex rules or modify rules to create complex rules, e.g., rules that specify conditions based upon multiple resources. For example, a rule that states "deny the requested action if a Websphere application server has connected to a DB2 database" may be modified with climate information so as to realize a policy that specifies, for example, "deny the requested action if a Websphere application server has connected to a DB2 database unless the requested action is authorized by at least two supervisors or unless the requested action is taken in response to a critical incident and has been authorized by one supervisor". Another exemplary climate dependent complex rule may specify a priority, e.g., a requested action will be denied if a supervisor sets a contrary policy in force, e.g. "in response to a routine request for change, deny the requested action if at least one supervisor has temporarily suspended activities associated with the requested action". Still further, static, dynamic and complex rules can be combined in one or more climate-dependent policies.

Climate awareness can be utilized in specifying policy requirements, conditions, exceptions or other characteristics that affect evaluation of the corresponding policy. In this regard, climate awareness may take into consideration, contexts related to aspects of the computing environment, circumstances associated with aspects of the computing environment, situations associated with aspects of the computing environment, etc. Moreover, the awareness capability may be implemented on a single device or such climate awareness capabilities may be distributed across multiple devices and/or other resources. Computing environment climate information and approaches to obtaining such information will be described in greater detail herein. The computing environment 100 is shown by way of illustration, and not by way of limitation, as an environment in which various aspects of the present invention may be practiced.

Figure 2:
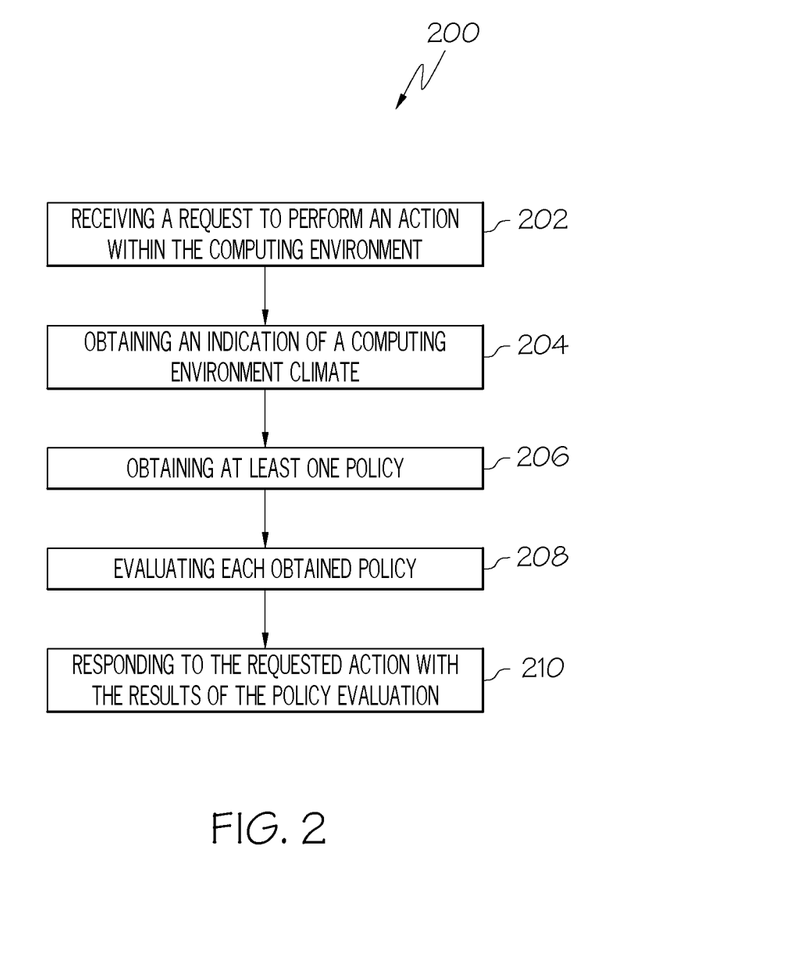
FIG. 2 is a flow chart of a method for implementing climate dependent policy management according to various aspects of the present invention.

Referring to FIG. 2, a flow chart 200 illustrates a method of guiding an information management process in a computing environment, e.g., by providing climate awareness to policy management decisions. A request to perform an action within the computing environment is received at 202. As an illustrative example, the method may include receiving an electronically communicated request to perform an action within a computing environment, where the request is received by a policy enforcement system manager 112 that is executing on a computer processing device, from a resource within the computing environment. With brief reference back to FIG. 1, as an illustration, a resource within the computing environment 100, e.g., a resource within one of the devices 102, 106, 108, etc., may communicate a request to the policy enforcement system manager 112 of the policy enforcement system 110 to take some form of action.

Referring back to FIG. 2, an indication of a computing environment climate is obtained at 204. The indication of climate obtained at 204 comprises information that is of interest in evaluating the requested action and may come from the request itself, by the policy enforcement system 110 and/or policy enforcement system manager 112 querying or otherwise obtaining information from one or more components of the computing environment 110, by one or more processes pushing, reporting or otherwise communicating information to the policy enforcement system 110, by the policy enforcement system 110 communicating otherwise interacting with one or more process managers or by utilizing other reasonable techniques. Still further, climate information may be obtained from multiple resources, e.g., using one or more of the techniques set out more fully above. Process managers are described in greater detail herein.

At least one policy is obtained at 206. For example, with reference to FIG. 1, at least one climate dependent policy 116 may be obtained from a storage device, e.g., a physical storage device hosting policy database 114, e.g., by the policy enforcement system manager 112. Each obtained policy is associated with at least one of the requested action, the resource requesting the action and the indicated climate. In practice, the indication of computing environment climate obtained at 204 and the one or more policies obtained at 206 need not occur in any particular order and may be performed serially (in either order) or in parallel in any practical manner utilized to obtain the appropriate data Each obtained policy is evaluated at 208. In this regard, the evaluation at 208 may be performed with respect to the action associated with the request and/or the resource that communicated the request to perform the action received by the policy enforcement system manager 112. Moreover, the policy enforcement system 110, e.g., via the policy enforcement system manager 112 responds to the request to perform the action with the results of the policy evaluation. For example, the response may include instructions that authorize, de-authorize, restrict, deny or otherwise indicate permission or lack of permission in performing the action associated with the request.

Figure 3:
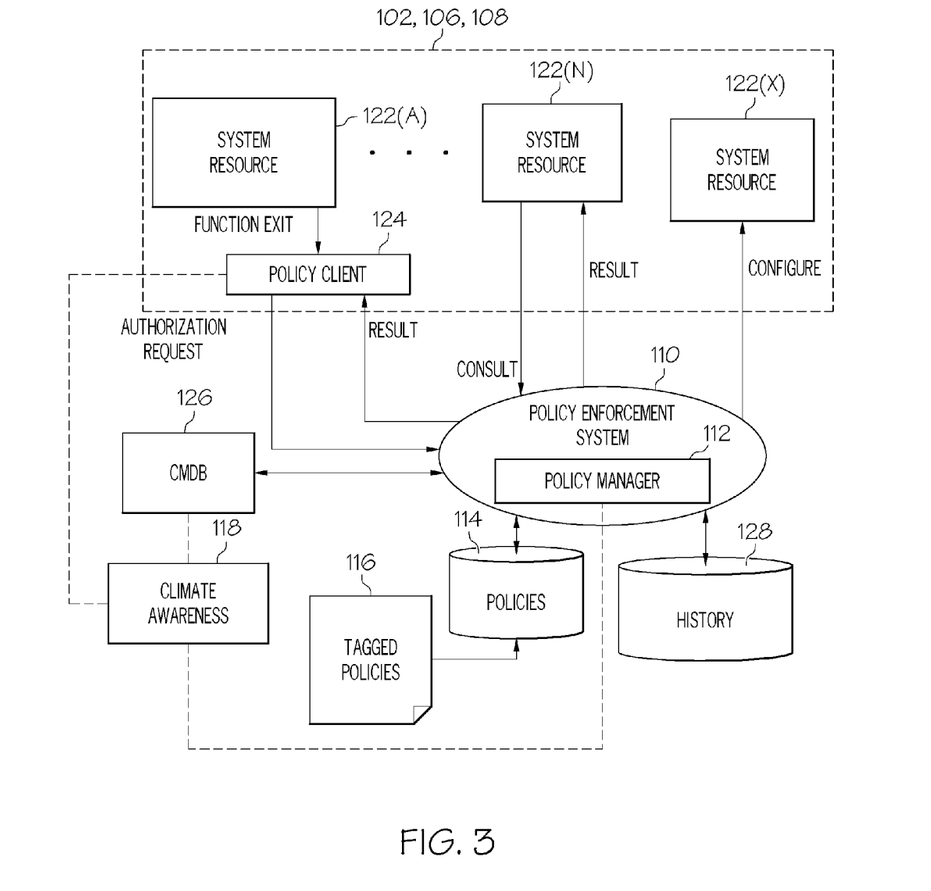
FIG. 3 is a schematic illustration of components of a computing environment supporting climate dependent policy management according to various aspects of the present invention.

Referring to FIG. 3, certain aspects of the computing environment 100 of FIG. 1 illustrate features of climate dependent policy management that may be implemented according to various aspects of the present invention. A first resource 122 (A), which may be a device 102, 106, 108 or component thereof within the computing environment 100 may communicate a request to the policy enforcement system 110 to request permission to implement a task. The request may be communicated in any practical manner. For example, a policy client 124 may be assigned to the system resource 122(A). The illustrated exemplary policy client 124 is configured to communicate with the policy enforcement system 110 on behalf of the resource 122(A), e.g., in response to detecting a function exit associated with an action of interest. As an illustrative example, a network administrator working at a system interface may enter a reboot command, e.g., by pressing the control, alt and delete keys on an associated keyboard or other input device of a corresponding processing device 102. In response thereto, the system resource 122(A) may acknowledge the keystroke and issue a reboot command that is either communicated to or otherwise intercepted by the policy client 124. The policy client 124 electronically communicates a request to perform an action (reboot in this example) within a computing environment as indicated by the legend AUTHORIZATION REQUEST. The request communicated from the policy client 124 is received by the policy enforcement system manager 112.

The policy enforcement system manager 112 obtains an indication of a computing environment climate that is of interest in evaluating the requested action, e.g., using climate awareness 118. There are a number of approaches to obtaining the necessary climate information in order to evaluate the request.

As an illustrative example, obtaining the indication of a computing environment climate may comprise obtaining an indication of a process workflow associated with the request to perform the action. For example, unlike conventional event correlation and similar policy management systems, the policy enforcement system manager 112 according to various aspects of the present invention can make policy based decisions based upon knowing that a requested action is part of an associated workflow. In this regard, a policy decision may have different outcomes based upon the associated workflow and is thus not limited to static rules that would otherwise limit the effectiveness of decision making by the policy enforcement system manager 112.

The indication of a workflow can be obtained by the policy enforcement system manager 112 in any number of reasonable ways. As a few non-limiting examples, the policy enforcement system manager 112 may receive an indication of the associated workflow as part of the request to perform the action.

In this regard, either the system resource 122(A) or the corresponding policy client 124 may recognize the state/conditions necessary to identify a workflow associated with the request. As an illustrative example, the policy enforcement system manager 112 may need to know whether an aspect of the computing environment is experiencing a critical error before allowing a reboot command to be processed.

The system resource 122(A) and/or policy client 124 may be particularly suited to know the workflow associated with the requested action, and may thus be in a position to provide the necessary climate information. For example, the system resource 122(A) may comprise an applications programming interface (API) executing on a processing device 102 that is dedicated to operations by a network administrator. The administrator may be interacting through the API with a workflow to resolve a critical issue that includes as one of the workflow steps, a reboot of a processing device. As such, the request may include information that indicates the reboot is being issued in the context of a critical incident workflow. Correspondingly, if the workflow is not related to a critical incident, that may also be specified.

The policy enforcement system manager 112 may also receive an indication of workflow based upon messages received from one or more resources across the computing environment. For example, an operator working with a help desk system may log a report of a critical incident and trigger a workflow to resolve the reported problem. In this example, the help desk system may communicate the workflow to the policy management system 110.

Still further, the policy enforcement system manager 112 may query one or more resources within the computing environment to identify the associated workflow, e.g., either expressly, indirectly or implicitly. For example, the policy enforcement system manager 112 may query databases associated with a help desk to see if there are any reports of critical incidents that have been reported. The policy enforcement system manager 112 may also query or otherwise poll event logs, network health monitoring systems and/or other resources available to the enterprise, and may discover events that are indicative of critical incidents (or lack thereof).

As another illustrative example, obtaining the indication of a computing environment climate may comprise obtaining an indication of at least one circumstance associated with the computing environment that is external to the process workflow associated with the request to perform the action. For example, climate information may indicate a requirement that supervisor authorization is required as at least one condition in evaluating the request. As such, the policy enforcement system manager 112 may query one or more other system resources to ascertain whether supervisor authorization has been granted, e.g., by querying a help desk system or other feature implemented within the computing environment that records the necessary information.

Also, certain necessary climate information may be associated with a corresponding workflow, and other necessary climate information may be unrelated to the corresponding workflow. For example, assume that the policy enforcement system receives a request to reboot a system and that a relevant obtained climate-aware policy states: "do not reboot the system unless the reboot occurs after business hours and does not coincide with the execution of scheduled management reports, except when handling a critical incident". To evaluate the request, the policy enforcement system is required to ascertain climate information relating to an associated workflow (whether the reboot is being issued in response to a critical incident workflow). The policy enforcement system is also required to ascertain climate information relating to aspects outsize the workflow associated with the reboot command (whether the reboot will coincide with the execution of scheduled management reports).

Still further, information necessary to analyze process information may be communicated to the policy enforcement system manager 112, e.g., in a push manner. For example, a service desk application may identify that a supervisor has authorized a particular network administrator to perform system functions. In response thereto, the help desk may push this information to the policy enforcement system 110.

The policy enforcement system manager 112 obtains at least one policy 116 from a storage device, e.g., a physical device that stores the contents of the policies database 114. Each retrieved policy may be associated with the action associated with the request, the resource that communicated the request to perform the action and/or the indicated climate. Thus, keeping with the present example, the policy enforcement system manager 112 may retrieve one or more policies that are directed to the action, e.g., a reboot command in the present application. In addition or alternatively, the policy enforcement system manager 112 may retrieve one or more policies with regard to the resource that submitted the request. In the present example, the policy enforcement system manager 112 may retrieve one or more policies that are specific to the resource 122(A), such as an API. Still further, in addition or in the alternative, the policy enforcement system manager 112 may retrieve policies that are specifically directed to the particular climate. Again, keeping with the present example, there may be one or more policies that are specific to a critical event climate.

Each obtained policy 116 may be tagged with climate information, e.g., in the form of one or more climate dependencies that characterize the climate variables of interest. As an example, a policy may be tagged with climate information in the form of a context that governs an exception to policy applicability and/or enforcement, such as by specifying "do not reboot the system except when handling a critical incident". As another example, a select policy may be tagged with climate information pertaining to the health parameters of a given server. Accordingly, authorization of a request based upon the select policy may be contingent on the health of that given server. As such, the policy enforcement system manager 112 may query the health status of the server in making a decision in response to a request based upon that policy.

The policy management system inspects the requested action, the policy, and the climate before determining whether the action is permitted. In this regard, the policy enforcement system manager 112 may evaluate the policies in view of the totality of circumstances, considering each policy with respect to the action associated with the request, the resource that communicated the request to perform the action received by the policy enforcement system manager 112, and the indicated climate. The policy enforcement system manager 112 then responds to the request to perform the action with the results of the policy evaluation. For example, the policy enforcement system manager 112 may convey a message that approves the requested action or denies the request to perform the action.

In a conventional ITIL policy management system, a static rule processed by the policy system may result in a denial of the request, e.g., where the system administrator does not have the required authorization to issue the reboot command. In actual practice, there may be certain workflows, e.g., maintenance of a database server that requires that the server be rebooted, where a lower ranking network administrator may not have the authority to reboot the server. However, such a rigid rule may provide unsatisfactory results where the workflow is in the context of a response to a critical incident and not just a routine maintenance or change incident. Thus, that same network administrator may need the authority to reboot the server in response to a critical incident, e.g., where the server crashes in a time of peak usage. As such, the policy enforcement system manager 112 according to various aspects of the present invention has an understanding of workflows and how to utilize workflow as part of its decision support.

As another illustrative example, the policy enforcement system manager 112 according to aspects of the present invention may utilize climate information that is characterized by at least one context outside the associated workflow. For example, a conventional policy system applied in an ITIL-based management environment may receive a request for an action, e.g., to reboot a file server. The requesting user may be authorized to reboot the server so the action is permitted. Comparatively, the policy enforcement system manager 112 according to aspects of the present invention may recognize aspects of a computing system climate of interest, e.g., the request to reboot may be recognized as part of a typical server planned maintenance workflow that is not critical to operation of the server. Moreover, the policy enforcement system manager 112 may recognize an external event to the workflow, e.g., that a management report is schedule to execute and that the scheduled management report would be adversely affected if the server were to be rebooted. As such, the policy enforcement system manager 112 may deny the request to reboot the file server based upon the identified workflow in consideration of the unrelated circumstance.

As yet another example, climate information in the context of role may be considered by the policy enforcement system manager 112. As an example, a policy may specify "do not reboot the system except when handling a critical incident, and when approved by at least two lines of management". Thus, role, e.g., a user authorized by at least two lines of management, can affect the outcome of a policy-based evaluation.

Still further, climate information in the form of workflow, external conditions not related to the workflow, role, etc. may be combined in any practical manner so that a given climate of interest may be defined by one or more climate aspects.

As a further illustrative example, the policy enforcement system manager 112 according to aspects of the present invention may consider external contexts that are intrinsic to the workflow evaluated in order to make a policy-based decision. For example, a workflow may be only permissible if it is predicated upon prior authorization from two supervisors. As such, the policy enforcement system manager 112 may query or otherwise ascertain whether the preconditions for the corresponding workflow have been satisfied in order to perform the policy evaluation. Correspondingly, the external context may be extrinsic to the workflow. For example, an unrelated circumstance, situation, event, etc., may impact the policy-based decision support provided by the policy enforcement system manager 112 according to aspects of the present invention. For example, as in a previous example, knowledge that a high priority process is scheduled to execute at a particular time may affect the outcome of a request to reboot.

As yet another illustrative example, a computing environment user may contact a help desk or service desk to report a problem identified on the computing environment. The person or computer implemented process at the help/service desk may classify the reported problem and create a trouble ticket or otherwise designate the reported problem within the computing environment. The information recorded in such systems may serve as climate awareness information 118 that may be queried or otherwise accessed and utilized by the policy enforcement system manager 112 in making climate-dependent policy decisions. For example, a trouble ticket in a service desk system may indicate that a system component has crashed, is running slow, needs upgraded, etc. The service desk may classify such incident report, e.g., by classifying a critical incident, low priority incident, etc.

As described in the illustrative examples, a policy management system according to aspects of the present invention may be linked into an operational environment, e.g., to address unplanned outages or otherwise account for sources of failure in implemented operational procedures in such a way that the policy management system is climate aware. As such, the policy management system may apply one or more climate-dependent policies that take into consideration, for example, the desirability to override another policy depending upon awareness as to what is occurring with regard to a corresponding computing environment. Thus, as an illustration, in a routine Release plan executed within the computing environment, it might be unacceptable to take a resource off-line. However, when responding to a critical incident, such an action might, in fact, be allowable.

Similarly, according to aspects of the present invention, a climate aware central governance point may be realized by introducing climate dependent policy information into a configuration management database (CMDB) 126 as illustrated in FIG. 3. In this regard, the CMDB contains a model of a physical computing environment or components thereof, which models the physical components and relationships there between. The CMDB may also/alternatively model relationships of configurations that have not yet been realized within a computing environment. Still further, the policy enforcement system 110 may include a history data source 128 that stores information of a historical context that may be utilized or of interest to the policy enforcement system 110.

As described more fully herein, the policy enforcement system manager 112 according to various aspects of the present invention is reactive to consultations from various system resources 122, e.g., 122(A)-122(N). In response to a consultation, e.g., a request as described more fully herein, the policy manger responds, such as with an authorization or prohibition against an action associated with the request.

In addition to, or in the alternative to reaction based processing, the policy enforcement system manager 112 according to aspects of the present invention may proactively configure resources to allow or disallow certain actions. As illustrated, the policy enforcement system manager 112 communicates a configuration command to resource 122(X) to proactively configure the resource. As an example, assume that the resource 122(X) comprises an application program interface (API). The policy management system may communicate a configuration command to the API that disable the "reboot" capability of the API unless and/or until an incident is detected that specifically requires a reboot.

Figure 4:
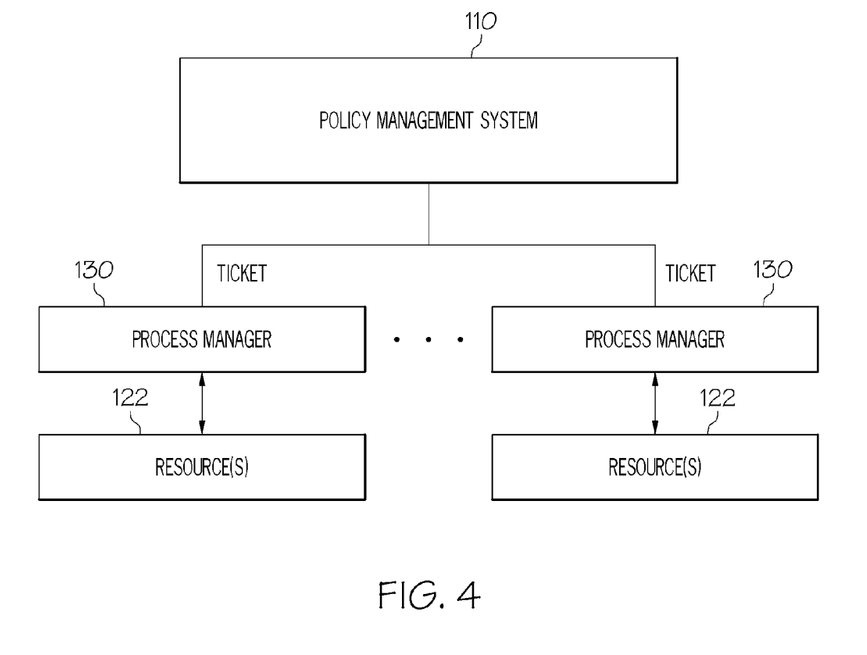
FIG. 4 is block diagram illustrating climate dependent policy management components according to aspects of the present invention.

Referring to FIG. 4, an exemplary system provides a plurality of process managers 130. Each process manager 130 is coupled to the policy enforcement system 110 and includes the ability to configure its corresponding resource. As an example, the process managers 130 may comprise incident process managers. Under this configuration, when processing an incident, an incident process manager notifies the policy management system of the incident. In response thereto, the policy management system retrieves one or more policies and implements climate-dependent policy management by evaluating the retrieved policies as described more fully herein. After evaluation, the policy management system communicates a message to the corresponding incident process manager, which configures its associated resource. Tickets may be utilized to ensure that the action is occurring in the context of the process managers, as an alternative to, for example, random administrator action.

In the disclosed system, the policy management process accepts policies that are augmented with climate. When the policy management system receives a request to authorize an action, it retrieves the climate for the action, e.g., from the process manager, evaluates the policies applicable to the climate, resource and requested action, and authorizes or prohibits the actions as appropriate.

In an ITIL environment, resources may be managed by grouping processes into categories, examples of which may include categories for managing situations including incidents, changes, releases and configuration modifications. According to various aspects of the present invention, the categorized processes can be augmented with climate-dependent decision support using the policy management system as described more fully herein.

Figure 5:
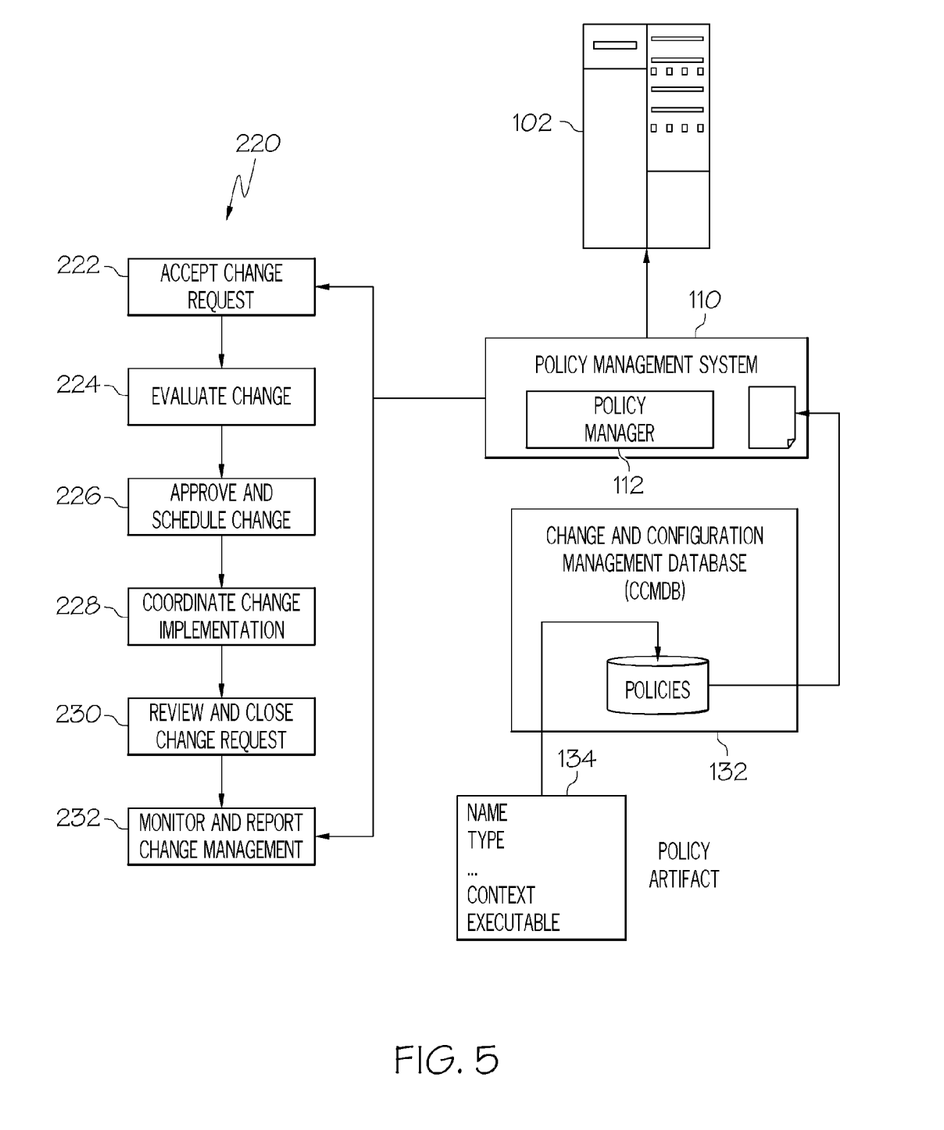
FIG. 5 is a flow diagram illustrating an implementation of an exemplary change request using climate dependent policy management according to aspects of the present invention.

Referring to FIG. 5, a flow diagram illustrates an exemplary approach to utilizing climate-dependent policy management in conjunction with a change and configuration management database (CCMDB). CCMDB corresponds to a CMDB and the workflows utilized to manage changes, etc., e.g., via the process managers. As illustrated, a policy enforcement system 110 interacts with the CCMDB 132 to provide climate-dependent policy based decision support. The policy enforcement system manager 112 accepts a change request at 222 and evaluates the change request at 224, e.g., using one or more climate-dependent policies as described more fully herein with reference to FIGS. 1-4. If the policy enforcement system manager 112 decides to approve the change, the requested change is scheduled at 226 and the climate dependent policy management system coordinates with the CCMDB at 228 to implement the change. After processing, the change request is reviewed and closed out as being completed at 230. The change is monitored and the implemented change is reported to the CCMDB at 232.

In this example, a CCMDB policy artifact 134 is associated with a configuration item (CI) in a manner analogous to how a policy is associated with a resource as described more fully above. Thus for example, assume that a network addressed storage (NAS) that is modeled in a CMDB, is associated with a climate-dependent policy artifact 134 that indicates that the NAS CI can only be rebooted during an approved change window, if authorized by at least one supervisor. Another exemplary climate-dependent policy artifact may associate with a database CI that indicates that the database must be backed up nightly, unless performing a particular process on the data in the database that can only be run at night. Climate-dependent policy artifacts 134 may also be indirectly applied to configuration items. For example, a climate-dependent policy artifact may be associated with a trading application CI within a model, but may also apply to any corresponding database used by the trading application, creating a secondary association between the policy and a corresponding database.

Figure 6:
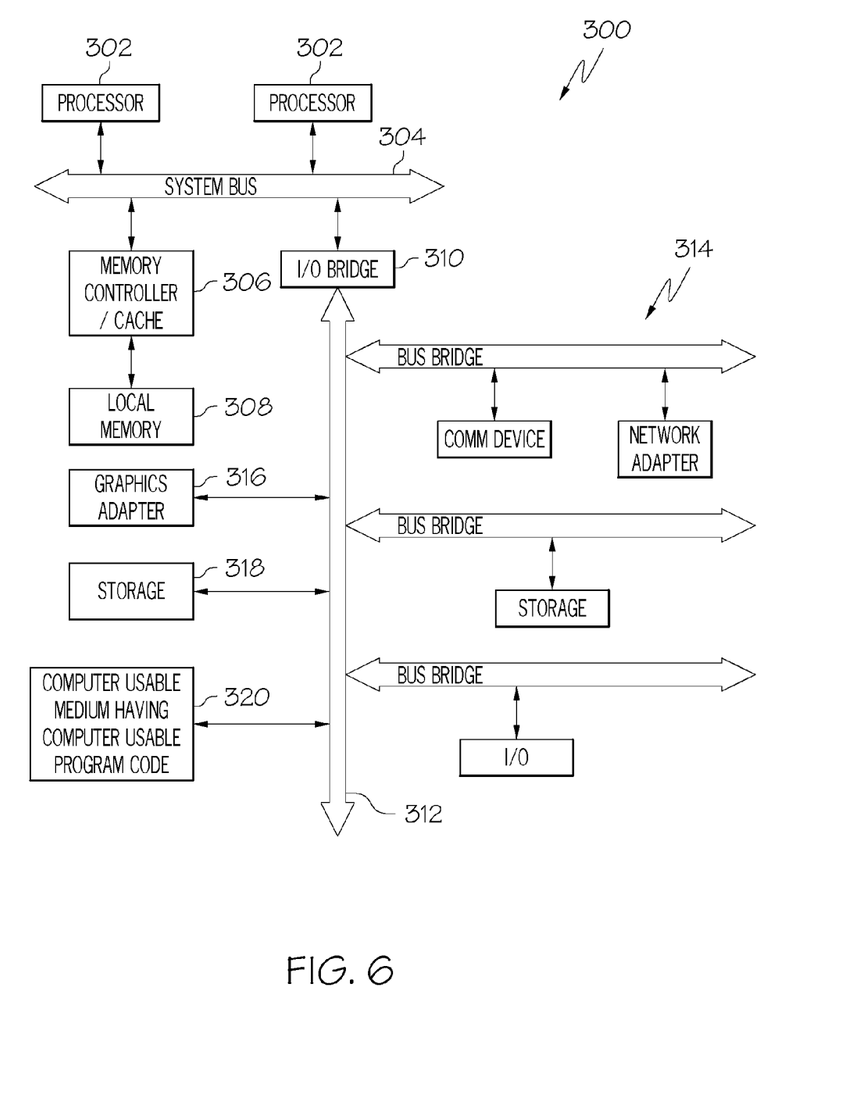
FIG. 6 is a block diagram of an exemplary computer system including a computer usable medium having computer usable program code embodied therewith, where the exemplary computer system is capable of executing a computer program product to provide climate dependent policy management according to various aspects of the present invention set out in greater detail herein.

Referring to FIG. 6, a block diagram of a data processing system is depicted in accordance with the present invention. Data processing system 300, such as one of the processing devices described herein, may comprise a symmetric multi-processor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bridge 310 is connected to the system bus 304 and provides an interface to an I/O bus 312. The I/O bus may be utilized to support one or more busses and corresponding devices 314, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 316, storage 318 and a computer usable storage medium 320 having computer usable program code embodied thereon. The computer usable program code may be executed to execute any aspect of the present invention, for example, to implement aspect of any of the methods, computer program products and/or system components illustrated in FIGS. 1-5. Moreover, the computer usable program code may be utilized to implement various aspects of policy management as set out further herein.

The data processing system depicted in FIG. 6 may be, for example, an IBM RS/6000 system, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function (s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of providing action management in a computing environment, comprising:
    receiving an electronically communicated request to perform an action within a computing environment, where the request is received by a policy management system executing on a computer processing device and the request is communicated from or on behalf of a resource within the computing environment;

obtaining an indication of a computing environment climate that is of interest in evaluating the requested action;
obtaining at least one policy from a storage device, where each obtained policy is associated with at least one of: the action associated with the request, the resource associated with the request, and the computing environment climate that is of interest in evaluating the requested action, wherein each obtained policy includes information that defines climate conditions that govern the applicability of the corresponding policy;
evaluating each obtained policy in view of the obtained indication of computing environment climate; and
responding to the request to perform the action based upon the results of the policy evaluation.

2. The method according to claim 1, wherein obtaining an indication of a computing environment climate comprises:
obtaining an indication of at least one of: a process workflow associated with the request to perform the action and at least one circumstance associated with the computing environment that is external to the process workflow associated with the request to perform the action.

3. The method according to claim 1, wherein obtaining at least one policy from a storage device that includes information that defines climate conditions that govern the applicability of the corresponding policy comprises obtaining at least one policy that has been tagged with climate information in the form of one or more parameters that characterize the climate variables of interest.

4. The method according to claim 1, further comprising:
inspecting the requested action with regard to the indication of a computing environment climate defined in terms of an associated workflow;
inspecting at least one policy associated with the requested action; and
determining whether the requested action is permitted based upon evaluating at least one policy; wherein:
responding to the requested action with the results of the policy evaluation further comprises responding with an indication as to whether the policy manager permits or refuses the requested action.

5. The method according to claim 1, wherein evaluating each obtained policy further comprises:
considering role as a factor when evaluating the policies with respect to at least one of the requested action, the obtained climate or the requesting resource.

6. The method according to claim 1, wherein obtaining an indication of a computing environment climate that is of interest in evaluating the requested action comprises:
obtaining climate information from a process manager.

7. The method according to claim 1, wherein responding to the requested action with the results of the policy evaluation comprises:
authorizing or prohibiting the requested action depending upon the results of the evaluation.

8. The method according to claim 1, further comprising:
proactively configuring at least one resource executing within the computing environment based upon the policies and obtained state information.

9. The method according to claim 1, wherein obtaining an indication of a computing environment climate that is of interest in evaluating the requested action comprises:
issuing by the policy system manager, a query to a corresponding component within the computing environment to obtain information that is utilized to evaluate the corresponding policy.

10. The method according to claim 1, further comprising implementing climate-aware policy management in an information technology information library (ITIL) system.

11. A computer program product to provide action management in a computing environment, comprising:
a computer readable storage medium having computer usable program code embodied therewith, the computer usable program code comprising:
computer usable program code configured to receive an electronically communicated request to perform an action within a computing environment, where the request is received by a policy management system executing on a computer processing device and the request is communicated from or on behalf of a resource within the computing environment;
computer usable program code configured to obtain an indication of a computing environment climate that is of interest in evaluating the requested action;
computer usable program code configured to obtain at least one policy from a storage device, where each obtained policy is associated with at least one of: the action associated with the request, the resource associated with the request, and the computing environment climate that is of interest in evaluating the requested action, wherein each obtained policy includes information that defines climate conditions that govern the applicability of the corresponding policy;
computer usable program code configured to evaluate each obtained policy in view of the obtained indication of computing environment climate; and
computer usable program code configured to respond to the request to perform the action based upon the results of the policy evaluation.

12. The computer program product according to claim 11, wherein the computer usable program code configured to obtain an indication of a computing environment climate comprises:
computer usable program code configured to obtain an indication of at least one of: a process workflow associated with the request to perform the action and at least one circumstance associated with the computing environment that is external to the process workflow associated with the request to perform the action.

13. The computer program product according to claim 11, wherein the computer usable program code configured to obtain at least one policy that includes information that defines climate conditions that govern the applicability of the corresponding policy from a storage device comprises:
computer usable program code configured to obtain at least one policy that has been tagged with climate information in the form of one or more parameters that characterize the climate variables of interest.

14. The computer program product according to claim 11, further comprising:
computer usable program code configured to inspect the requested action with regard to the indication of a computing environment climate defined in terms of an associated workflow;
computer usable program code configured to inspect at least one policy associated with the requested action; and
computer usable program code configured to determine whether the requested action is permitted based upon evaluating at least one policy; wherein:
computer usable program code configured to respond to the requested action with the results of the policy evaluation further comprises responding with an indication as to whether the policy manager permits or refuses the requested action.

15. The computer program product according to claim 11, wherein the computer usable program code configured to evaluate each obtained policy further comprises:
computer usable program code configured to consider role as a factor when evaluating the policies with respect to at least one of the requested action, the obtained climate or the requesting resource.

16. The computer program product according to claim 11, wherein the computer usable program code configured to obtain an indication of a computing environment climate that is of interest in evaluating the requested action comprises:
computer usable program code configured to obtain climate information from a process manager.

17. The computer program product according to claim 11, wherein the computer usable program code configured to respond to the requested action with the results of the policy evaluation comprises:
computer usable program code configured to authorize or prohibit the requested action depending upon the results of the evaluation.

18. The computer program product according to claim 11, further comprising:
computer usable program code configured to proactively configure at least one resource executing within the computing environment based upon the policies and obtained state information.

19. The computer program product according to claim 11, wherein the computer usable program code configured to obtain an indication of a computing environment climate that is of interest in evaluating the requested action comprises:
computer usable program code configured to issue by the policy system manager, a query to a corresponding component within the computing environment to obtain information that is utilized to evaluate the corresponding policy.

20. The computer program product according to claim 11, further comprising computer usable program code configured to implement climate-aware policy management in an information technology information library (ITIL) system.

21. A system to provide action management in a computing environment, comprising:
a processor;
a memory device;
program code resident in the memory device, the program code executable by the processor to execute a policy management system by:
implementing a policy manager configured to receive an electronically communicated request to perform an action within a computing environment, where the request is communicated from or on behalf of a resource within the computing environment;
obtaining an indication of a computing environment climate that is of interest in evaluating the requested action;
obtaining at least one policy from a storage device, where each obtained policy is associated with at least one of: the action associated with the request, the resource associated with the request, and the computing environment climate that is of interest in evaluating the requested action, wherein each obtained policy includes information that defines climate conditions that govern the applicability of the corresponding policy;
evaluating each obtained policy in view of the obtained indication of computing environment climate; and
responding to the request to perform the action based upon the results of the policy evaluation.

* * * * *